United States Patent
Takahashi et al.

(10) Patent No.: US 12,190,570 B2
(45) Date of Patent: ***Jan. 7, 2025

(54) OBJECT DETECTION DEVICE, LEARNING METHOD, AND RECORDING MEDIUM

(71) Applicant: NEC Corporation, Tokyo (JP)

(72) Inventors: Katsuhiko Takahashi, Tokyo (JP); Yuichi Nakatani, Tokyo (JP); Asuka Ishii, Tokyo (JP); Tetsuo Inoshita, Tokyo (JP); Gaku Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 397 days.

This patent is subject to a terminal disclaimer.

(21) Appl. No.: 17/624,913

(22) PCT Filed: Jul. 11, 2019

(86) PCT No.: PCT/JP2019/027483
§ 371 (c)(1),
(2) Date: Jan. 5, 2022

(87) PCT Pub. No.: WO2021/005776
PCT Pub. Date: Jan. 14, 2021

(65) Prior Publication Data
US 2022/0277553 A1  Sep. 1, 2022

(51) Int. Cl.
*G06V 10/00* (2022.01)
*G06V 10/22* (2022.01)
(Continued)

(52) U.S. Cl.
CPC .......... *G06V 10/776* (2022.01); *G06V 10/225* (2022.01); *G06V 10/7753* (2022.01); *G06V 2201/07* (2022.01)

(58) Field of Classification Search
CPC ........ G06N 20/00; G06N 20/20; G06N 20/10; G06V 10/809; G06V 10/776;
(Continued)

(56) References Cited

U.S. PATENT DOCUMENTS 10,198,671 B1 * 2/2019 Yang .................... G06V 10/768
10,740,618 B1 * 8/2020 Karlsson ................ G06V 10/25
(Continued)

FOREIGN PATENT DOCUMENTS

JP 2007-058882 A 3/2007
JP 2013-045433 A 3/2013
(Continued)

OTHER PUBLICATIONS

International Search Report for PCT Application No. PCT/JP2019/027483, mailed on Sep. 24, 2019.

*Primary Examiner* — Amir Alavi

(57) ABSTRACT

In an object detection device, a plurality of object detection units output a score indicating probability that a predetermined object exists, for each partial region set to image data inputted. The weight computation unit computes weights for merging the scores outputted by the plurality of object detection units, using weight calculation parameters, based on the image data. The merging unit merges the scores outputted by the plurality of object detection units, for each partial region, with the weights computed by the weight computation unit. The target model object detection unit configured to output a score indicating probability that the predetermined object exists, for each partial region set to the image data. The first loss computation unit computes a first loss indicating a difference of the score of the target model object detection unit from a ground truth label of the image data and the score merged by the merging unit. The first parameter correction unit corrects parameters of the target model object detection unit to reduce the first loss.

12 Claims, 12 Drawing Sheets

(51) Int. Cl.
*G06V 10/774* (2022.01)
*G06V 10/776* (2022.01)

(58) Field of Classification Search
CPC ............. G06V 10/225; G06V 10/7753; G06V 2201/07; G06T 7/00
See application file for complete search history.

(56) References Cited

U.S. PATENT DOCUMENTS

| | | | |
|---|---|---|---|
| 10,885,370 B2* | 1/2021 | Hakim | G06V 20/582 |
| 11,017,550 B2* | 5/2021 | Frossard | B60K 31/0008 |
| 11,107,219 B2* | 8/2021 | Cohen | G06V 10/25 |
| 11,138,745 B2* | 10/2021 | Vallespi-Gonzalez | G06N 5/046 |
| 11,461,915 B2* | 10/2022 | Unnikrishnan | G06V 10/764 |
| 11,721,106 B2* | 8/2023 | Grancharov | G06F 18/22 382/103 |
| 2002/0061135 A1 | 5/2002 | Naoi et al. | |
| 2013/0051662 A1 | 2/2013 | Shiozaki et al. | |
| 2017/0364766 A1* | 12/2017 | Das | G06V 20/20 |
| 2019/0095759 A1 | 3/2019 | Kaneda | |
| 2022/0277552 A1* | 9/2022 | Takahashi | G06V 10/778 |
| 2022/0277553 A1* | 9/2022 | Takahashi | G06V 10/809 |
| 2023/0334837 A1* | 10/2023 | Takahashi | G06V 10/776 |

FOREIGN PATENT DOCUMENTS

| | | |
|---|---|---|
| JP | 2019-036240 A | 3/2019 |
| JP | 2019-061579 A | 4/2019 |
| JP | 2019-079445 A | 5/2019 |

\* cited by examiner

OBJECT DETECTION DEVICE, LEARNING METHOD, AND RECORDING MEDIUM

This application is a National Stage Entry of PCT/JP2019/027483 filed on Jul. 11, 2019, the contents of all of which are incorporated herein by reference, in their entirety.

TECHNICAL FIELD

The present invention relates to a technology that detects an object included in an image.

BACKGROUND ART

It is known that by performing learning using large amounts of pattern data, the performance of a recognizer can be improved. Tuning is also performed to obtain a recognizer suited to each environment from a base recognizer. Moreover, methods of improving the recognition accuracy depending on different environments have been variously proposed. For example, Patent Reference 1 discloses a pattern recognition device that performs a recognition processing in accordance with an environment where text is written. The pattern recognition device performs the recognition processing by calling any one or more recognizers from among a plurality of registered recognizers according to the state of a processing target extracted from an input image.

Also, as another measure for improving recognizer performance, a method has been proposed in which a plurality of recognizers with different characteristics are constructed, and an overall determination is made on the basis of outputs therefrom. For example, Patent Reference 2 discloses an obstacle detection device that makes a final determination on the basis of determination results of a plurality of determination units that determine whether or not an obstacle exists.

PRECEDING TECHNICAL REFERENCES

Patent Document

Patent Reference 1: Japanese Patent Application Laid-Open under No. 2007-058882
Patent Reference 2: Japanese Patent Application Laid-Open under No. 2019-036240

SUMMARY

Problem to be Solved by the Invention

In the above technique, since the recognition performance is improved by using multiple recognizers, the device inevitably becomes a large scale. Therefore, the above-described method cannot be deemed to be appropriate when an object detection device used for video monitoring or other purposes is to be deployed on a site.

It is one object of the present invention to provide an object detection device capable of building a small-scale target model for a new site using models learned in various field environments.

Means for Solving the Problem

In order to solve the above problem, according to one aspect of the present invention, an object detection device comprising:

a plurality of object detection units configured to output a score indicating probability that a predetermined object exists, for each partial region set to image data inputted;

a weight computation unit configured to compute weights for merging the scores outputted by the plurality of object detection units, using weight calculation parameters, based on the image data;

a merging unit configured to merge the scores outputted by the plurality of object detection units, for each partial region, with the weights computed by the weight computation unit;

a target model object detection unit configured to output a score indicating probability that the predetermined object exists, for each partial region set to the image data;

a first loss computation unit configured to compute a first loss indicating a difference of the score of the target model object detection unit from a ground truth label of the image data and the score merged by the merging unit; and a first parameter correction unit configured to correct parameters of the target model object detection unit to reduce the first loss.

According to another aspect of the present invention, a learning method of an object detection device comprising:

outputting a score indicating probability that a predetermined object exists, for each partial region set to inputted image data, from a plurality of object detection units;

computing weights for merging the scores outputted by the plurality of object detection units, using weight calculation parameters, based on the image data;

merging the scores outputted by the plurality of object detection units, for each partial region, with the computed weights;

outputting a score indicating probability that the predetermined object exists, for each partial region set to the image data, from a target model object detection unit;

computing a first loss indicating a difference of the score of the target model object detection unit from a ground truth label of the image data and the merged score; and correcting parameters of the target model object detection unit to reduce the first loss.

According to still another aspect of the present invention, a recording medium recording a program causing a computer to execute a learning processing of an object detection device comprising:

outputting a score indicating probability that a predetermined object exists, for each partial region set to inputted image data, from a plurality of object detection units;

computing weights for merging the scores outputted by the plurality of object detection units, using weight calculation parameters, based on the image data;

merging the scores outputted by the plurality of object detection units, for each partial region, with the computed weights;

outputting a score indicating probability that the predetermined object exists, for each partial region set to the image data, from a target model object detection unit;

computing a first loss indicating a difference of the score of the target model object detection unit from a ground truth label of the image data and the merged score; and correcting parameters of the target model object detection unit to reduce the first loss.

Effect of the Invention

According to the present invention, it is possible to construct a small-scale target model for a new field using models learned in various field environments.

EXAMPLE EMBODIMENTS

[Principles]

First, a basic principle in the example embodiments of the present invention will be described. Generally, when an AI (Artificial Intelligence) model for video monitoring is deployed on a site, system integration works for reconstruction of a model (collection of images in the site, annotation, learning, etc.) are often required for each site due to the insufficient recognition accuracy. In the example embodiments, in order to reduce the cost of system integration, first, a large-scale model that is robust to environmental variation is constructed by collecting and merging source models learned in various field environments. Then, based on this large-scale model, a small-scale model for a new site, i.e., a target model, is constructed.

Figure 1:
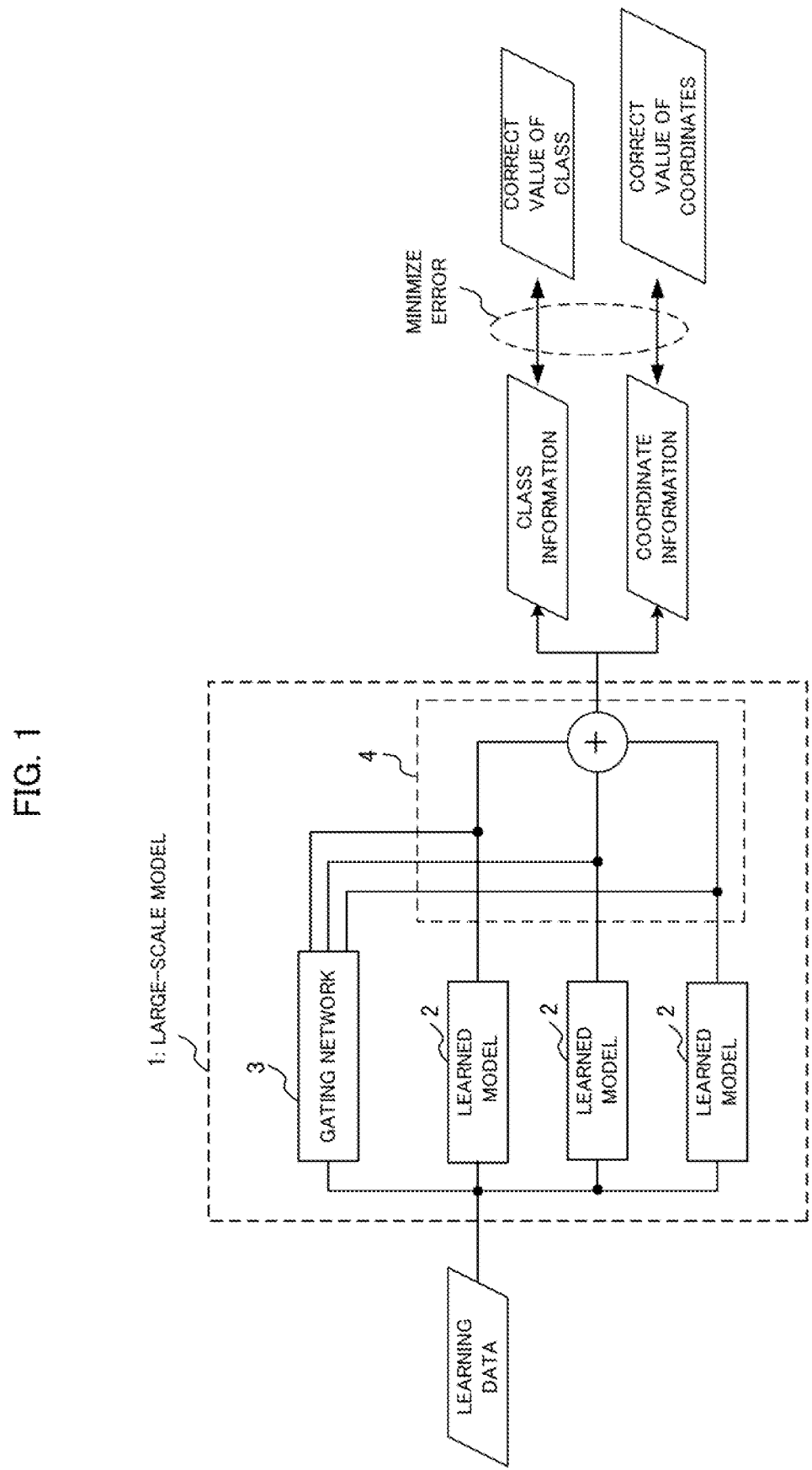
FIG. 1 illustrates a configuration for constructing a large-scale model using multiple learned models.

FIG. 1 illustrates a configuration for constructing a large-scale model using multiple learned models. As shown in FIG. 1, the large-scale model 1 includes a plurality of (three in the example of FIG. 1) learned models 2, a gating network 3, and an arithmetic unit 4. The learned model 2 is a source model, each of which is learned in a different environment. Here, the learned model 2 is a model for detecting objects from image data. The image data collected in a new site are inputted as learning data to the plurality of learned models 2 and the gating networks 3. Incidentally, in the learning data, the correct value of the class and the correct value of the coordinates are prepared in advance as the ground truth label corresponding the learning data.

Each of the learned models 2 performs object detection based on the inputted learning data, and outputs, for each partial region set at the middle stage of object detection, the class information about the class of the detected object and the coordinate information indicating the position of the partial region. The class information includes a class code indicating the type of the object and a score indicating the probability that the object indicated by the class code exists.

The gating network 3 outputs weights for the information outputted by the learned models 2. The arithmetic unit 4 merges the information outputted by the learned models 2 using the weights outputted by the gating network 3. The arithmetic unit 4 outputs class information that is obtained by merging the class information outputted by the learned models 2 using the weights. Further, the arithmetic unit 4 outputs the coordinate information obtained by merging the coordinate information outputted by the learned models 2 using the weights.

The class information and the coordinate information outputted from the arithmetic unit 4 are compared with the correct value of the class and the correct value of the coordinates prepared in advance, respectively, and the errors are computed. Then, learning of the gating network 3 is performed so as to minimize the errors. Specifically, the parameters of the gating network 3 are corrected so that the errors are reduced. The gating network 3 estimates whether each learned model 2 is good or poor for each of the inputted image data, and learns the values of the weights indicating the optimal merging ratio of the learned models 2. The learning of the large-scale model 1 is performed until a certain degree of accuracy is obtained. Thus, a large-scale model with high accuracy is constructed using multiple learned source models.

Figure 2:
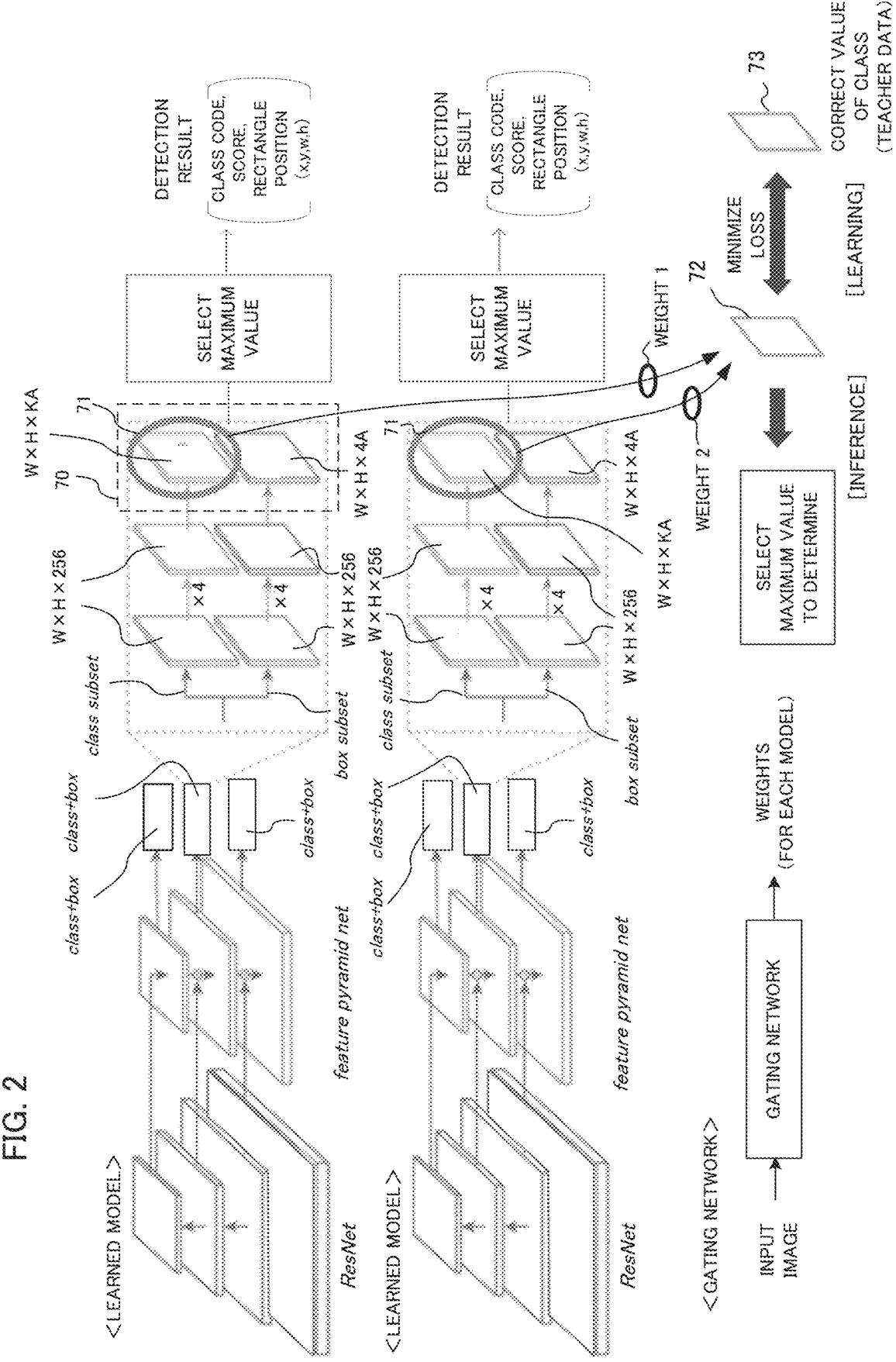
FIG. 2 schematically illustrates an example of the processing of constructing a large-scale model.

Next, a specific example of constructing a large-scale model will be described. FIG. 2 schematically shows an example of processing of constructing a large-scale model 1. In FIG. 2, the number of the learned models 2 is set to two. In the example of FIG. 2, the learned model 2 is constructed by RetinaNet. In the example of FIG. 2, for convenience of explanation, it is assumed that only the class information is used among the information outputted by each learned model 2.

The learned model 2 generates a feature pyramid net including a plurality of feature maps of different size from the inputted image data by ResNet (Residual Network). In each feature map, anchor boxes are set, and the learned model 2 performs detection of an object for each anchor box. However, in the large-scale model 1, the learned model 2 does not perform the maximum value selection processing of outputting the detected object and its score and coordinate information in a list format or the like, specifically the NMS (Non-Maximum Suppression) processing, but outputs the class information and the coordinate information of the recognized object computed for each anchor box before the NMS processing as they are. Here, all the partial regions, for which the presence or absence of a recognition target object is inspected, are called "anchor boxes".

Figure 3:
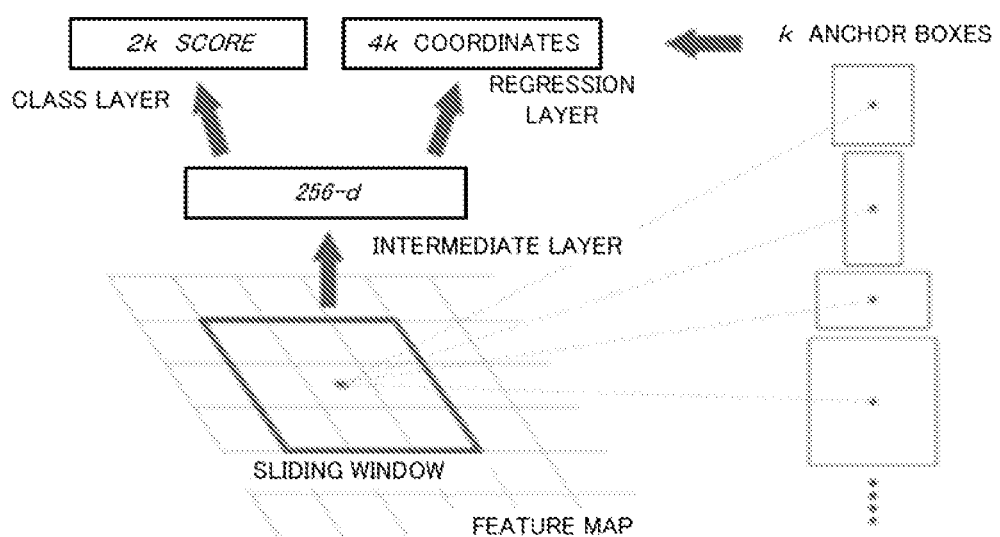
FIG. 3 is a diagram for explaining the concept of anchor boxes.

FIG. 3 is a diagram for explaining the concept of anchor boxes. As illustrated, a sliding window is set on a feature map obtained by the convolution of a CNN (Convolutional Neural Network). In the example of FIG. 3, k anchor boxes (hereinafter simply referred to as "anchors") of different size are set with respect to a single sliding window, and each anchor is inspected for the presence or absence of a recognition target object. In other words, the anchors are k partial regions set with respect to all sliding windows.

The number of anchors depends on the structure and size of the neural network. In FIG. 2, the upper row of an output network 70 stores class information with respect to W×H×A anchors (in K dimensions; that is, there are K types of recognition targets), and the lower row stores coordinate information (in four dimensions) for the W×H×A anchors. Here, "W" indicates the number of variations of the anchor center in the horizontal direction, "H" indicates the number of variations of the anchor center in the vertical direction, and "A" indicates the number of variations in the vertical or horizontal size of the anchor. The coordinate information may be expressed as absolute values of the coordinate information for the four sides on the top, bottom, left, and right of a rectangular region where a recognition target object exists or as relative positions from a reference position uniquely determined for the anchor, or may be expressed from the standpoint of the width and the height of the left side and the top side rather than the four sides.

The output network 70 illustrated in FIG. 2 is set with respect to a single layer of a feature pyramid net, and K-dimensional score information and 4-dimensional coordinate information are outputted similarly with respect to the other layers of the feature pyramid net. Hereinafter, the number of anchors set with respect to all layers of the feature pyramid net is designated "Na". The score information and coordinate information for the same anchor are saved in a predetermined memory location of a memory for storing the information, so as to be easily associated with each other.

Each learned model 2 outputs the class information 71 of the number of anchors×the number of classes. The gating network 3 outputs the weight determined for each learned model 2. The arithmetic unit 4 computes the weighted sum for each of the same anchors for the class information outputted from each learned model 2, and outputs the class information 72. The sum of squares of the difference between the class information 72 and the corrected value (teacher data) 73 of the class prepared in advance is defined as a loss, and the weights outputted by the gating network 3 are learned so as to minimize this loss. Thus, a large-scale model 1 is constructed.

Figure 4:
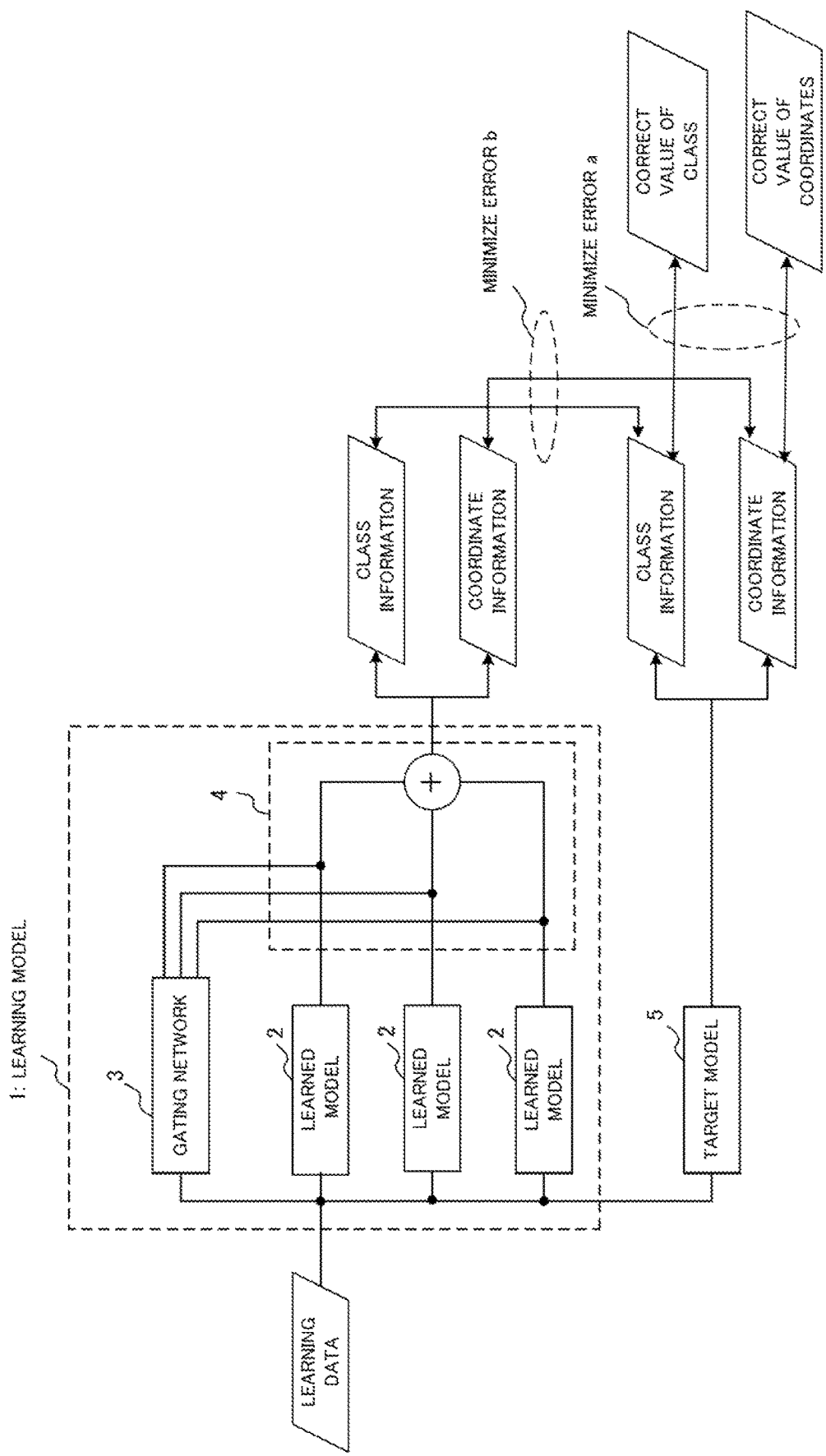
FIG. 4 illustrates a configuration for constructing a target model using a large-scale model.

Next, a target model is constructed using the large-scale model 1 for which learning is completed. FIG. 4 shows a configuration for constructing a target model using the large-scale model 1. The large-scale model 1 is the model in which the learning of the gating network 3 is completed, and the learning of the target model 5 is executed here. To the target model 5, the learning data is inputted. Incidentally, the target model 5 is constructed by the same model as the learned model 2. In the learning of the target model 5, as the teacher data, the information outputted by the large-scale model 1 are used in addition to the ground truth labels prepared in advance. Specifically, the class information and the coordinate information outputted by the target model 5 based on the inputted learning data are compared with the correct value of the class and the correct value of the coordinates prepared in advance for the learning data, and the learning of the target model 5 is performed so as to minimize the error "a". In addition, the class information and the coordinate information outputted by the target model 5 are compared with the class information and the coordinate information outputted by the large-scale model 1 based on the same learning data, and the learning of the target model 5 is performed so as to minimize the error "b". However, the error of the coordinate information is computed only for the anchors of the position where the object exists in the ground truth label, and the error of the coordinate information is set to "0" for the anchors of the position where the object does not exist.

Figure 5:
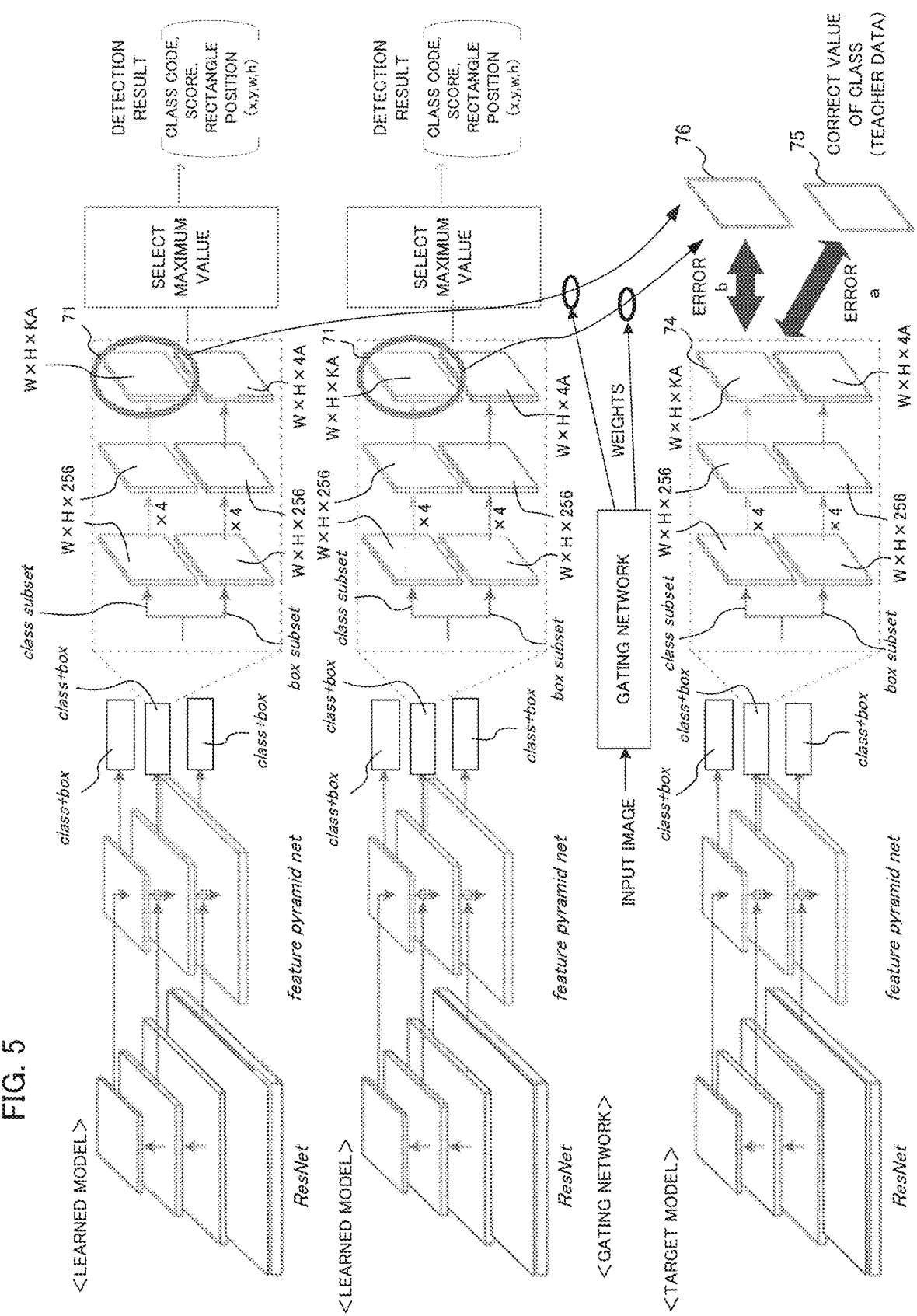
FIG. 5 schematically illustrates an example of the processing of constructing a target model.

FIG. 5 schematically shows a specific example of processing for constructing a target model using a large-scale model for which learning has been completed. In FIG. 5, the learned model 2 is constructed by RetinaNet. In FIG. 5, for convenience of explanation, it is assumed that learning using only class information is performed. The large-scale model 1 computes the weighted sum of the class information 71 outputted by the learned models 2 and the weights outputted by the gating network 3, and outputs the class information 76. On the other hand, the target model 5 outputs the class information 74 based on the learning data. The error "a" between the class information 74 outputted by the target model 5 and the correct value 75 of the class prepared in advance, and the error "b" between the class information 74 outputted by the target model and the class information 76 outputted by the large-scale model 1 are used as a loss. The learning of the target model 5 is performed so as to minimize the loss.

Thus, in the example embodiments of the present invention, multiple source models learned in various environments are merged to construct a large-scale model that is robust to environmental change. Then, the inference result of the large-scale model is used as the teacher data, and the learning of the target model is performed using the learning data collected in the new site. This makes it possible to construct a small-scale and high-accuracy target model suitable for the environment of a new site.

First Example Embodiment

Next, a first example embodiment of the present invention will be described.

(Hardware Configuration)

Figure 6:
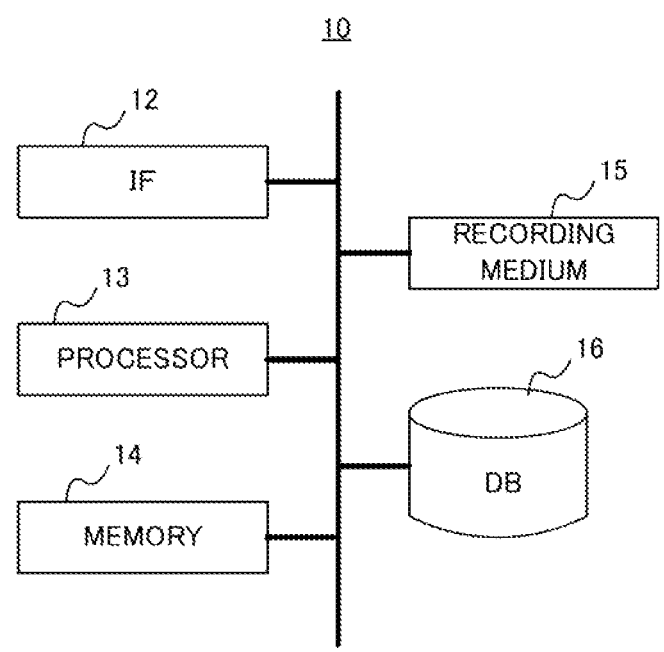
FIG. 6 is a block diagram illustrating a hardware configuration of an object detection device.

FIG. 6 is a block diagram illustrating a hardware configuration of an object detection device. As illustrated, an object detection device 10 is provided with an interface (IF) 12, a processor 13, a memory 14, a recording medium 15, and a database (DB) 16.

The interface 12 communicates with an external device. Specifically, the interface 12 is used to input image data to be subjected to object detection or image data for learning from an outside source, and to output an object detection result to an external device.

The processor 13 is a computer such as a CPU (Central Processing Unit) or a CPU and a GPU (Graphics Processing Unit), and controls the object detection device 10 as a whole by executing a program prepared in advance. The memory 14 includes ROM (Read Only Memory), RAM (Random Access Memory), and the like. The memory 14 stores various programs to be executed by the processor 13. The memory 14 is also used as a work memory when the processor 13 executes various processing.

The recording medium 15 is a non-volatile, non-transitory recording medium such as a disk-shaped recording medium or a semiconductor memory, and is configured to be removably attachable to the object detection device 10. The recording medium 15 records various programs executed by the processor 13. When the object detection device 10 executes a learning processing, a program recorded in the recording medium 15 is loaded into the memory 14 and executed by the processor 13.

The database 16 stores image data for learning that is used in the learning processing by the object detection device 10. The image data for learning includes ground truth labels. Note that in addition to the above, the object detection device 10 may also be provided with an input device such as keyboard and mouse, a display device, and the like.

(Functional Configuration for Learning)

Figure 7:
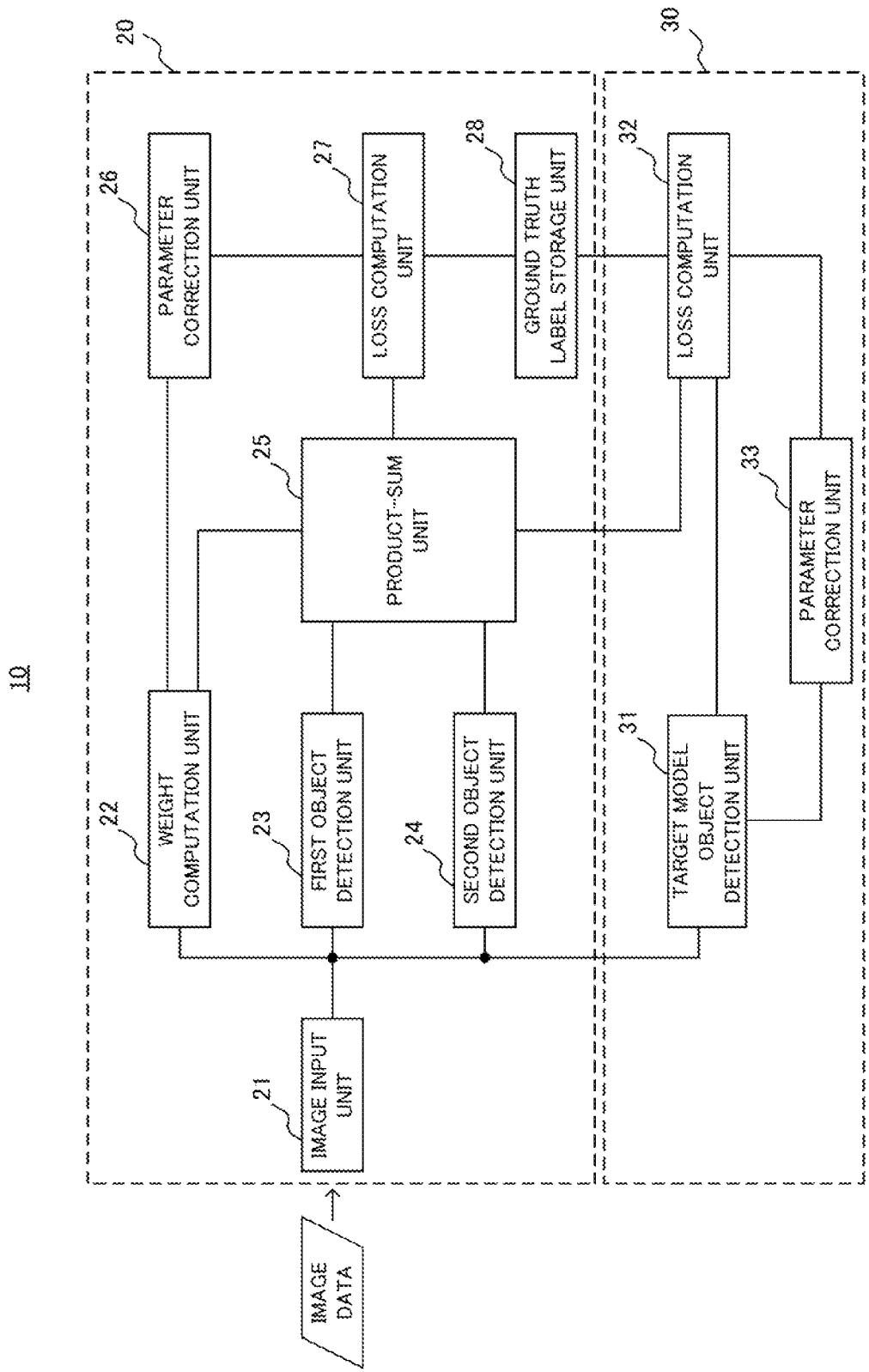
FIG. 7 illustrates a functional configuration of the object detection device for learning according to a first example embodiment.

Next, the functional configuration of the object detection device for learning will be described. FIG. 7 is a block diagram illustrating a functional configuration of the object detection device 10 for learning. The object detection device 10 first executes a learning step of a large-scale model including a plurality of object detection units (hereinafter, referred to as a "large-scale model learning step"), and then executes a learning step of a target model using the learned large-scale model (hereinafter, referred to as a "target model learning step").

As illustrated, the object detection device 10 roughly includes a large-scale model unit 20 and a target mode unit 30. The large-scale mode unit 20 includes an image input unit 21, a weight computation unit 22, a first object detection unit 23, a second object detection unit 24, a product-sum unit 25, a parameter correction unit 26, a loss computation unit 27, and a ground truth label storage unit 28. The target mode unit 30 includes a target model object detection unit 31, a loss computation unit 32 and a parameter correction unit 33. Note that the first object detection unit 23 and the second object detection unit 24 are learned in advance, and the learning of them is not performed in the processing described below. In the above configuration, the image input unit 21 is achieved by the interface 12 illustrated in FIG. 6, the ground truth label storage unit 28 is achieved by the database 16 illustrated in FIG. 6, and other components are achieved by the processor 13 illustrated in FIG. 6.

Image data is inputted into the image input unit 21. The image data is image data for learning, and is taken in an area to be subjected to object detection. As described above, a ground truth label indicating an object included in the image is prepared in advance for each image data.

The first object detection unit 23 has a configuration similar to a neural network for object detection by deep learning, such as SSD (Single Shot Multibox Detector), RetinaNet, Faster-RCNN (Regional Convolutional Neural Network). However, as described above, the first object detection unit outputs the score information and the coordinate information of the recognition target object computed for each anchor box before the NMS processing as they are. As described above, the first object detection unit 23 has already been learned and its parameters are fixed.

The second object detection unit 24 is similar to the first object detection unit 23 and has the same model structure. However, the first object detection unit 23 and the second object detection unit 24 have different parameters in the respective internal networks due to such factors that the learning data or the initial values of the parameters are different when learning was performed, and consequently have different recognition characteristics.

The weight computation unit 22 optimizes the parameters for computing the weights (hereinafter referred to as "weight computation parameters") inside. The weight computation unit 22 is configured by a deep neural network or the like that is applicable to regression problems, such as ResNet (Residual Network). The weight computation unit 22 determines weights with respect to image data inputted into the image input unit 21 when merging the score information and coordinate information outputted by the first object detection unit 23 and the second object detection unit 24, and outputs information indicating each of the weights to the product-sum unit 25. Basically, the number of dimensions of the weights is equal to the number of object detection units used. In this case, the weight computation unit 22 preferably computes weights such that the sum of the weight for the first object detection unit 23 and the weight for the second object detection unit 24 is "1". For example, the weight computation unit 22 may set the weight for the first object detection unit 23 to "$\alpha$", and set the weight for the second object detection unit 24 to "$1-\alpha$". With this arrangement, an averaging processing in the product-sum unit 25 can be simplified. Note that in the case where there are two parameters related to a single object in the object detection units (for example, a parameter indicating the probability of a certain object and a parameter indicating the improbability of a certain object), the number of dimensions of the weights is double the number of object detection units used.

The product-sum unit 25 computes the product-sums of the score information and the coordinate information outputted by the first object detection unit 23 and the second object detection unit 24 for respectively corresponding anchors on the basis of the weights outputted by the weight computation unit 22, and then calculates an average value. Note that the product-sum operation on the coordinate information is only performed on anchors for which the existence of a recognition target object is indicated by the ground truth label, and calculation is unnecessary for all other anchors. The average value is computed for each anchor and each recognition target object, and has Na×(k+4) dimensions. Note that the product-sum unit 25 is one example of a merging unit according to the present invention.

The ground truth label storage unit 28 stores ground truth labels with respect to the image data for learning. Specifically, the ground truth label storage unit 28 stores class information and coordinate information about a recognition target object existing at each anchor in an array for each anchor as the ground truth labels. The ground truth label storage unit 28 stores class information indicating that a recognition target object does not exist and coordinate information in the storage areas corresponding to anchors where a recognition target object does not exist. Note that in many cases, the original ground truth information with respect to the image data for learning is text information indicating the type and rectangular region of a recognition target object appearing in an input image, but the ground truth labels stored in the ground truth label storage unit 28 are data obtained by converting such ground truth information into class information and coordinate information for each anchor.

For example, for an anchor that overlaps by a predetermined threshold or more with the rectangular region in which a certain object appears, the ground truth label storage unit 28 stores a value of 1.0 indicating the score of the object as the class information at the location of the ground truth label expressing the score of the object, and stores relative quantities of the position (an x-coordinate offset from the left edge, a y-coordinate offset from the top edge, a width offset, and a height offset) of the rectangular region in which the object appears with respect to a standard rectangular position of the anchor as the coordinate information. In addition, the ground truth label storage unit 28 stores a value indicating that an object does not exist at the location of the ground truth label expressing the scores for other objects. Also, for an anchor that does not overlap by a predetermined threshold or more with the rectangular region in which a certain object appears, the ground truth label storage unit 28 stores a value indicating that an object does not exist at the location of the ground truth label where the score and coordinate information of the object are stored. For a single anchor, the class information is k-dimensional, and the coordinate information is 4-dimensional. For all anchors, the class information is (Na×k)-dimensional and the coordinate information is (Na×4)-dimensional. To this conversion, it is possible to apply methods used by deep neural network programs for object detection tasks and generally available to the public.

The loss computation unit 27 checks the score information and coordinate information of (Na×(k+4))-dimension outputted by the product-sum unit 25 with the ground truth labels stored in the ground truth label storage unit 28 to compute a loss value. Specifically, the loss computation unit 27 computes an identification loss related to the score information and a regression loss related to the coordinate information. The (Na×(k+4))-dimensional average value outputted by the product-sum unit 25 is defined in the same way as the score information and coordinate information that the first object detection unit 23 outputs for each anchor and each recognition target object. Consequently, the loss computation unit 27 can compute the value of the identification loss by a method that is exactly the same as the method of computing the identification loss with respect to the output of the first object detection unit 23. The loss computation unit 27 computes the cumulative differences of the score information with respect to all anchors as the identification loss. Also, for the regression loss, the loss computation unit 27 computes the cumulative differences of the coordinate information only with respect to anchors where an object exists, and does not consider the difference of the coordinate information with respect to anchors where no object exists.

Note that deep neural network learning using identification loss and regression loss is described in the following document, which is incorporated herein as a reference.

"Learning Efficient Object Detection Models with Knowledge Distillation", NeurIPS 2017

In the following, the loss computed by the loss computation unit 27 will be referred to as "large-scale model loss". The loss computation unit 27 corresponds to the second loss computation unit of the present invention, and the large-scale model loss corresponds to the second loss of the present invention.

The parameter correction unit 26 corrects the parameters of the network in the weight computation unit 22 so as to reduce the loss computed by the loss computation unit 27. At this time, the parameter correction unit 26 fixes the parameters of the networks in the first object detection unit 23 and the second object detection unit 24, and only corrects the parameters of the weight computation unit 22. The parameter correction unit 26 can compute parameter correction quantities by ordinary error backpropagation.

The weight computation unit 22 predicts what each object detection unit is good or poor at with respect to an input image to optimize the weights. The product-sum unit 25 multiplies the weights by the output from each object detection unit, and averages the results. Consequently, a final determination can be made with high accuracy compared to a standalone object detection unit. For example, in the case where the first object detection unit 23 is good at detecting a pedestrian walking alone and the second object detection unit 24 is good at detecting pedestrians walking in a group, if a person walking alone happens to appear in an input image, the weight computation unit 22 assigns a larger weight to the first object detection unit 23. Additionally, the parameter correction unit 26 corrects the parameters of the weight computation unit 22 such that the weight computation unit 22 computes a large weight for the object detection unit that is good at recognizing the image data for learning. By learning the parameters in the weight computation unit 22 in this manner, it becomes possible to construct a large-scale mode capable of computing the product-sum of the outputs from the first object detection unit 23 and the second object detection unit 24 to perform overall determination.

The target model object detection unit 31 is an object detection unit of the target model to be newly constructed. The target model object detection unit 31 has a configuration similar to the neural network for object detection, which is the same configuration as the first object detection unit 23 and the second object detection unit 24. The target model object detection unit 31 outputs the score information and the coordinate information of the recognition target object to the loss computation unit 32 based on the image data for learning inputted to the image input unit 21.

The loss computation unit 32 checks the score information and the coordinate information outputted by the target model object detection unit 31 with the ground truth label stored in the ground truth label storage unit 28, similarly to the loss computation unit 27, and calculates the identification loss and the regression loss. Further, the loss computation unit 32 checks the score information and the coordinate information outputted by the target model object detection unit 31 with the score information and the coordinate information outputted by the product-sum unit 25 to calculate the identification loss and the regression loss. The score information and the coordinate information outputted by the product-sum unit 25 correspond to the score information and the coordinate information by the large-scale model. Then, the loss computation unit 32 supplies the computed loss to the parameter correction unit 33.

Incidentally, the image data for learning may include image data (referred to as "unlabeled image data") that does not have a ground truth label. For the unlabeled image data, the loss computation unit 32 may check the score information and the coordinate information outputted by the target model object detection unit 31 only with the score information and the coordinate information outputted by the product-sum unit 25 to generate the identification loss and the regression loss and output to them to the parameter correction unit 33. Hereinafter, the loss computed by the loss computation unit 32 is also referred to as "target model loss". Incidentally, the loss computation unit 32 corresponds to the first loss computation unit of the present invention, and the target model loss corresponds to the first loss of the present invention.

The parameter correction unit 33 corrects the parameters of the network in the target model object detection unit 31 so as to reduce the loss computed by the loss computation unit 32. The parameter correction unit 33 may determine the correction amount of the parameters by the normal error backpropagation method.

Figure 8:
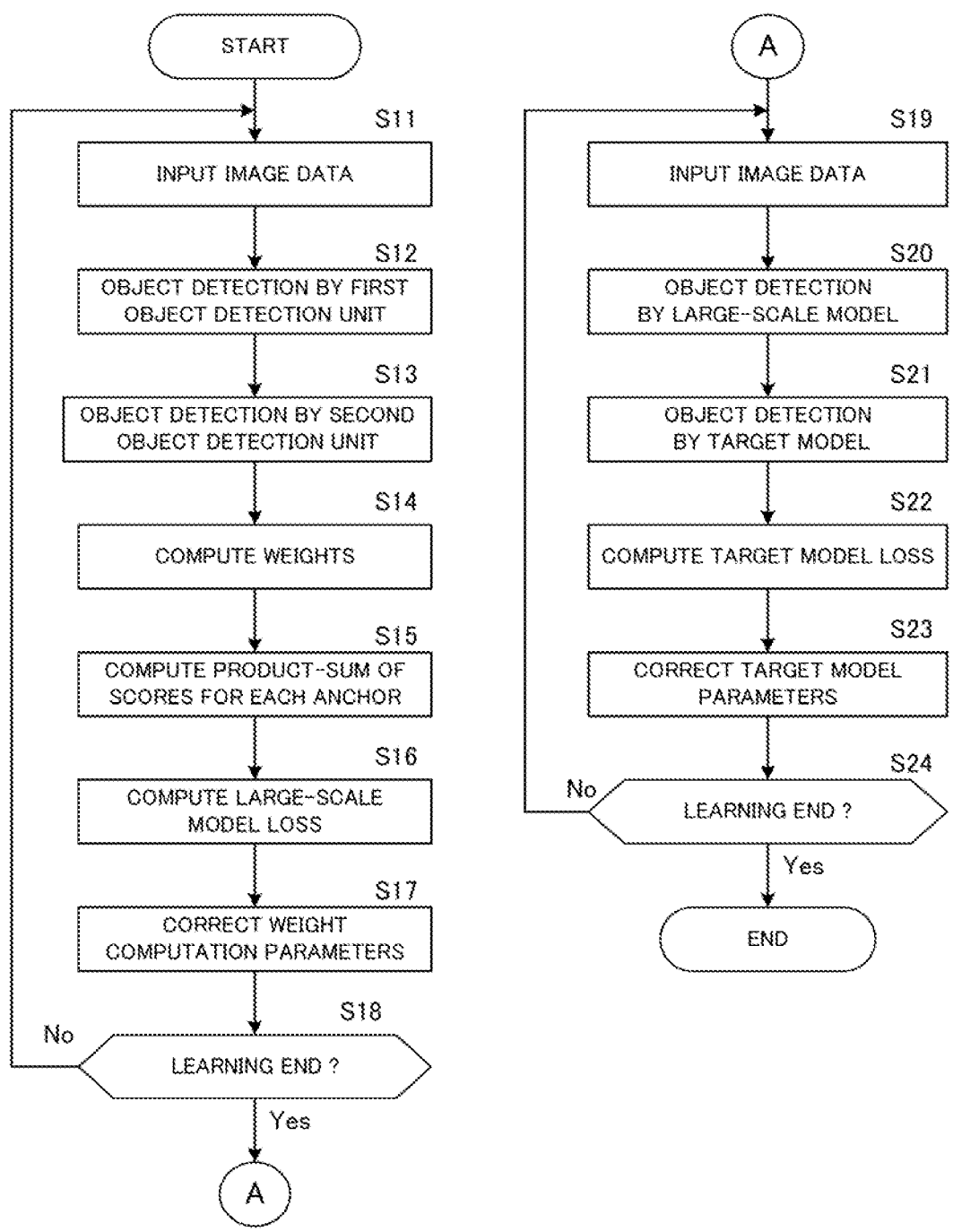
FIG. 8 is a flowchart of a learning processing by the object detection device of the first example embodiment.

Next, operations by the object detection device 10 for learning will be described. FIG. 8 is a flowchart of a learning processing by the object detection device 10. This processing is achieved by causing the processor 3 illustrated in FIG. 6 to execute a program prepared in advance. In FIG. 8, steps S11 to S18 correspond to the large-scale model learning step, and steps S19 to S24 correspond to the target mode learning step. Incidentally, during the execution of the large-scale mode learning step, the target model object detection unit 31, the loss computation unit 32 and the parameter correction unit 33 do not operate.

First, image data for learning is inputted into the image input unit 21 (step S11). The first object detection unit 23 performs object detection using the image data, and outputs score information and coordinate information about recognition target objects in the images for each anchor and each recognition target object (step S12). Similarly, the second object detection unit 24 performs object detection using the image data, and outputs score information and coordinate information about recognition target objects in the images for each anchor and each recognition target object (step S13). Also, the weight computation unit 22 receives the image data and computes weights with respect to each of the outputs from the first object detection unit 23 and the second object detection unit 24 (step S14).

Next, the product-sum unit 15 multiplies the score information and the coordinate information about the recognition target objects outputted by the first object detection unit 23 and the score information and the coordinate information about the recognition target objects outputted by the second object detection unit 24 by the respective weights computed by the weight computation unit 12 for each anchor, and adds the results of the multiplications to output the average value (step S15). Next, the loss computation unit 27 checks the difference between the obtained average value and the ground truth labels, and computes the large-scale model loss (step S16). Thereafter, the parameter correction unit 26 corrects the weight computation parameters in the weight computation unit 22 to reduce the value of the large-scale model loss (step S17).

The object detection device 10 repeats the above steps S11 to S17 while a predetermined condition holds true, and then ends the process. Note that the "predetermined condition" is a condition related to the number of repetitions, the degree of change in the value of the loss, or the like, and any method widely adopted as a learning procedure for deep learning can be used.

When the large-scale model learning step is completed (Step S18: Yes), then the target model learning step is executed. In the target model learning step, the internal parameters of the weight computation unit 22 are fixed to the values learned in the large-scale model learning step. Incidentally, the internal parameters of the first object detection unit 23 and the second object detection unit 24 are also fixed to the previously learned values.

When the image data for learning is inputted to the image input unit 21 (Step S19), the large-scale model unit 20 performs object detection using the inputted image data, and outputs the score information and the coordinate information of the recognition target object in the image to the loss computation unit 32 for each anchor and for each recognition target object (Step S20). Further, the target model object detection unit 31 performs object detection using the inputted image data, and outputs the score information and the coordinate information of the recognition target object in the image to the loss computation unit 32 for each anchor and each recognition target object (step S21). Next, the loss computation unit 32 compares the score information and the coordinate information outputted by the target model object detection unit 31 with the ground truth label stored in the ground truth label storage unit 28 and the score information and the coordinate information outputted by the large-scale model unit 20 to compute the target model loss (step S22). Then, the parameter correction unit 33 corrects the parameters in the target model object detection unit 31 so as to reduce the value of the target model loss (step S23). The object detection device 10 repeats the above-described steps S19 to S24 for a predetermined period of time, and then ends the processing.

As described above, according to the object detection device 10 of the first example embodiment, first, learning of the large-scale model is performed using a plurality of learned object detection units, and then learning of the target model is performed using the large-scale model. Therefore, it becomes possible to construct a small-scale and high-accuracy target model suitable for the environment of the new site.

(Functional Configuration for Inference)

Figure 9:
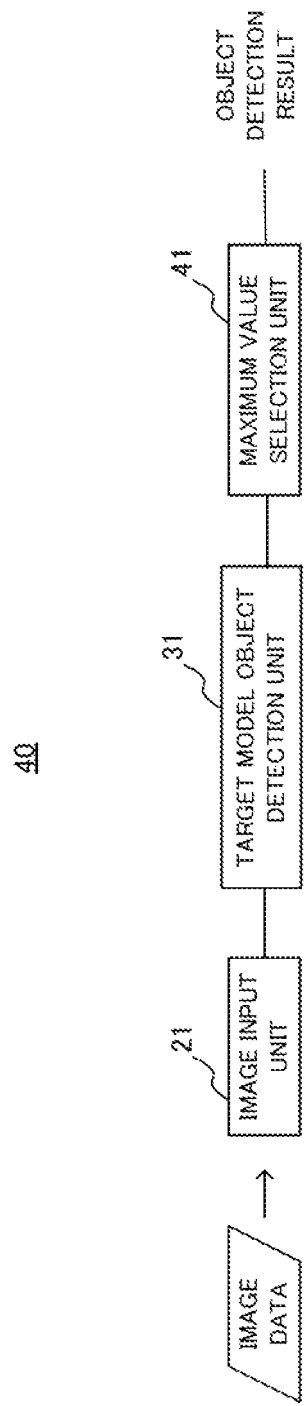
FIG. 9 illustrates a functional configuration of the object detection device for inference according to the first example embodiment.

Next, the functional configuration of the object detection device for inference will be described. FIG. 9 is a block diagram illustrating a functional configuration of an object detection device 40 for inference. Incidentally, the object detection device 40 for inference is also basically realized by the hardware configuration shown in FIG. 6.

As shown in FIG. 9, the object detection device 40 for inference includes an image input unit 21, a target model object detection unit 31, and a maximum value selection unit 41. Here, the image input unit 21 and the target model object detection unit 31 are the same as the object detection device 10 for learning shown in FIG. 7. Incidentally, the target model object detection unit 31 has already been learned by the target model learning step described above.

When the image data for inference is inputted to the image input unit 21, the target model object detection unit 31 performs object detection using the learned internal parameters, and outputs the score information and the coordinate information of the recognition target object for each anchor and for each recognition target object. The maximum value selection unit 41 identifies the type of the recognition target object by applying the NMS processing to the score information of Nark dimensions outputted by the target model object detecting section 31, and specifies the position of the recognition target object from the coordinate information corresponding to the anchor to output the object detection result. The object detection result includes the type and the position for each of the recognition target object. Thus, it is possible to obtain the object detection result using the target model object detection unit 31 learned using the large-scale model.

(Modifications)

The following modifications can be applied to the first example embodiment described above.

(1) In the first example embodiment described above, learning is performed using score information and coordinate information outputted by each object detection unit. However, learning may also be performed using only score information, without using coordinate information.

(2) In the first example embodiment described above, the two object detection units of the first object detection unit 23 and the second object detection unit 24 are used. However, using three or more object detection units poses no problem in principle. In this case, it is sufficient if the dimensionality (number) of weights outputted by the weight computation unit 22 is equal to the number of object detection units.

(3) Any deep learning method for object detection may be used as the specific algorithms forming the first object detection unit 23 and the second object detection unit 24. Moreover, the weight computation unit 22 is not limited to deep learning for regression problems, and any function that can be learned by error backpropagation may be used. In other words, any error function that is partially differentiable by the parameters of a function that computes weights may be used.

(4) Additionally, while the first example embodiment described above is directed to the object detection device, it is not limited to the detection of objects, and it may also be configured as an event detection device that outputs event information and coordinate information about an event occurring in an image. An "event" refers to something like a behavior, movement, or gesture by a predetermined person or a natural phenomenon such as a mudslide, an avalanche, or a rise in the water level of a river, for example.

(5) Also, in the first example embodiment described above, while object detection units having the same model structure are used as the first object detection unit 23 and the second object detection unit 24, different models may also be used. In such a case, it is necessary to devise associations in the product-sum unit 25 between the anchors of both models corresponding to substantially the same positions. This is because the anchors of different models do not match exactly. As a practical implementation, each anchor set in the second object detection unit 24 may be associated with one of the anchors set in the first object detection unit 23, a weighted average may be computed for each anchor set in the first object detection unit 23, and score information and coordinate information may be outputted for each anchor and each recognition target object set in the first object detection unit 23. The anchor associations may be determined by calculating image regions corresponding to anchors (rectangular regions where an object exists) and associating the anchors for which image regions appropriately overlap each other.

(6) While the weight computation unit 22 according to the first example embodiment sets a single weight for the image as a whole with respect to the output of each object detection unit, the weight computation unit 22 may compute a weight for each anchor with respect to the output of each object detection unit, that is, for each partial region of the image. Provided that Na is the number of anchors set in the image data and Nf is the number of object detection units, the number of dimensions of the information indicating the weight outputted by the weight computation unit 22 is Na×Nf dimensions. The weight computation unit 22 can be configured by a deep neural network applicable to multidimensional regression problems or the like. Also, the weight computation unit 22 may include a network having a structure that averages the weights corresponding to nearby anchors, such that nearby anchors for respective object detection units have weights that are as close to each other as possible.

(7) If the weight computation unit 22 has different binary classifiers for each class like in RetinaNet for example, the weights may be changed for each class rather than for each anchor. In this case, the weight computation unit 22 may compute the weight for each class, and the parameter correction unit 26 may correct the parameters for each class. Provided that Na is the number of anchors set in the image data and Nf is the number of object detection units, the number of dimensions of the weights outputted by the weight computation unit 22 is Na×Nf dimensions. On the other hand, provided that the number of classes is Nc dimensions, when the weight is computed for each class, the number of dimensions of the weights outputted by the weight computation unit 22 is Nc×Nf dimensions. To learn the weight computation parameters for each class by the parameter correction unit, it is sufficient to apply backpropagation so as to minimize the loss from the output layer neuron side as usual. According to this configuration, in the case where the respective object detection units are good at detecting different classes, for example, it is possible to compute different optimal weights for each class.

Second Example Embodiment

Next, a second example embodiment of the present invention will be described. Incidentally, the object detection device 10x for learning described below is realized by the hardware configuration shown in FIG. 6. In the first example embodiment, a large-scale model is learned first, and then the large-scale model is used to learn the target model. In contrast, in the second example embodiment, learning of the large-scale model and learning of the target model are performed simultaneously.

(Functional Configuration for Learning)

Figure 10:
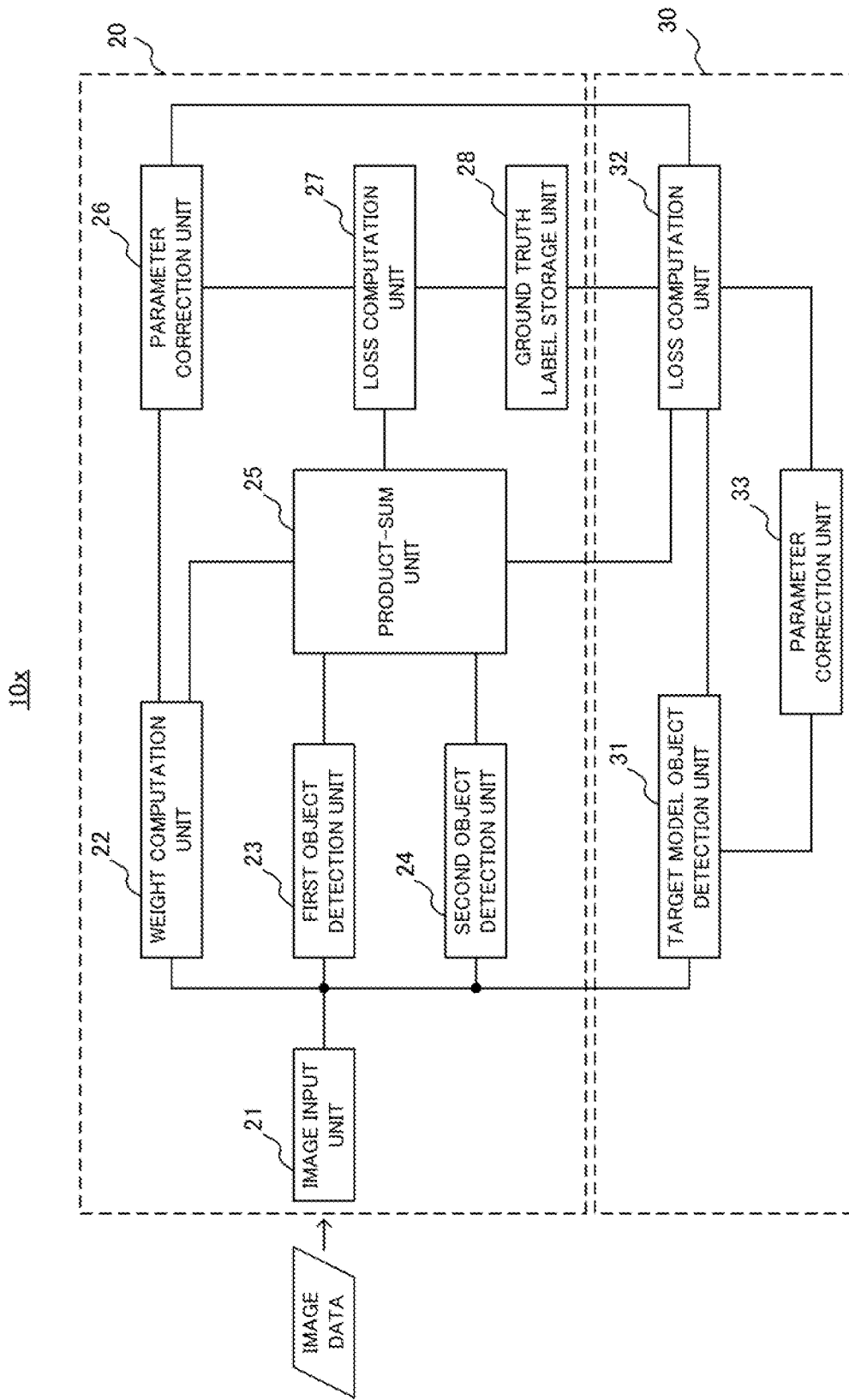
FIG. 10 illustrates a functional configuration of the object detection device for learning according to a second example embodiment.

FIG. 10 is a block diagram illustrating a functional configuration of the object detection device 10x for learning according to the second example embodiment. As illustrated, in the object detection device 10x for learning according to the second example embodiment, the output of the loss computation unit 32 is also supplied to the parameter correction unit 26. Except for this point, the object detection device 10x for learning according to the second example embodiment is the same as the object detection device 10 of the first example embodiment shown in FIG. 7, and each element operates basically in the same manner as the first example embodiment.

In the second example embodiment, the loss computation unit 32 supplies the target model loss not only to the parameter correction unit 33, but also to the the parameter correcting unit 26. The parameter correction unit 26 corrects the weight calculation parameters of the weight computation unit 22 in consideration of the target model loss. Specifically, the parameter correction unit 26 corrects the weight calculation parameters so that the large-scale model loss and the target model loss are reduced.

Figure 11:
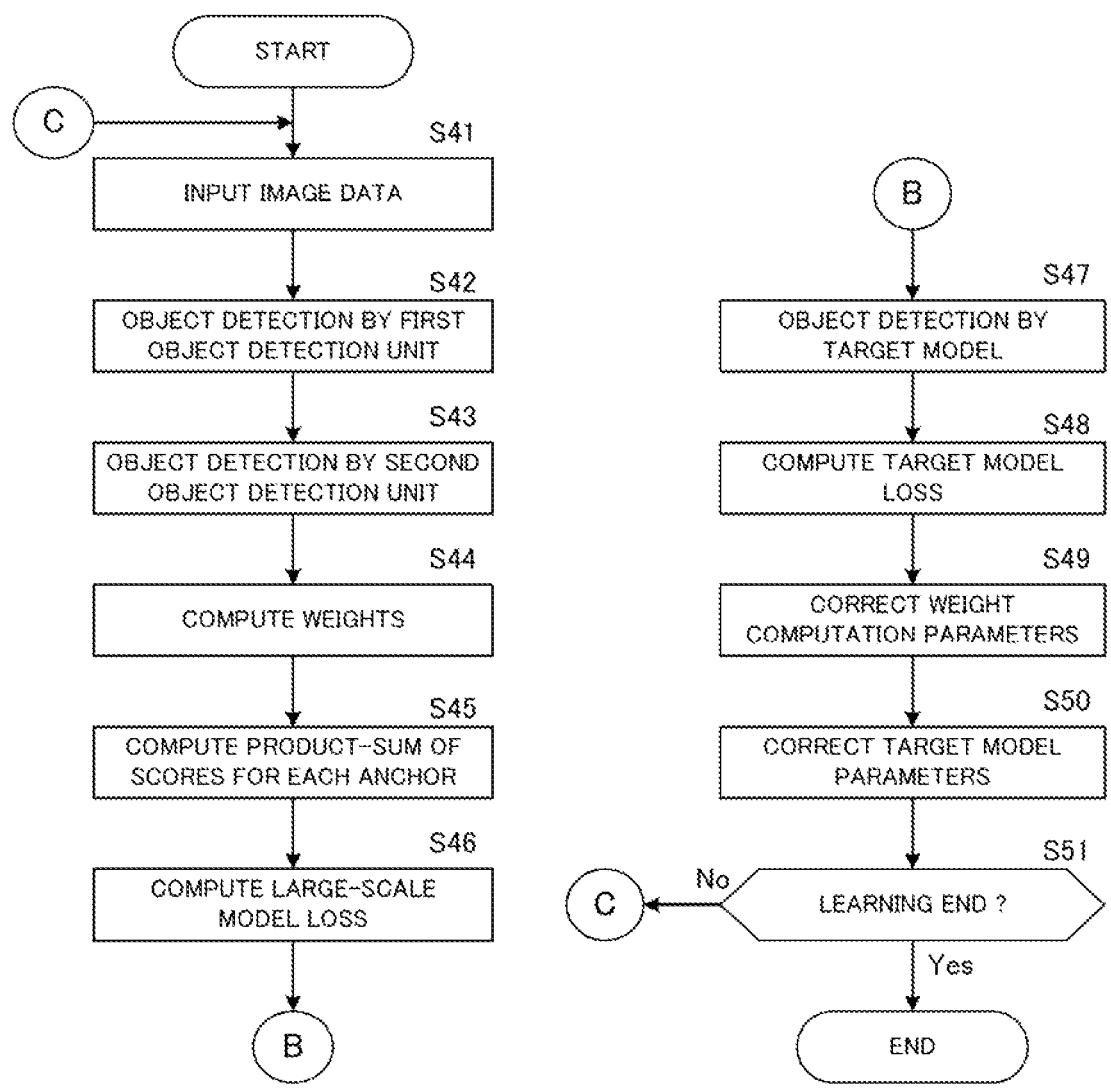
FIG. 11 is a flowchart of learning processing by the object detection device according to the second example embodiment.

Next, the operation of the object detection device 10x for learning will be described. FIG. 11 is a flowchart of learning processing performed by the object detection device 10x. This processing is realized by causing the processor 13 shown in FIG. 6 to execute a program prepared in advance. In the learning processing illustrated in FIG. 11, steps S41 to S46 are the same as steps S11 to S16 of the learning processing performed by the object detection device 10 according to the first example embodiment illustrated in FIG. 8, and thus description thereof is omitted.

When the loss computation unit 27 computes the large-scale model loss in step S46, the target model object detection unit 31 performs object detection using the inputted image data, and outputs the score information and the coordinate information of the recognition target object in the image for each anchor and for each recognition target object (step S47). Next, the loss computation unit 32 compares the score information and the coordinate information outputted by the target model object detection unit 31 with the ground truth label and the score information and the coordinate information outputted by the large-scale model unit 20 to compute the target model loss, and supplies the target model loss to the parameter correction unit 26 and the parameter correction unit 33 (step S48).

The parameter correction unit 26 corrects the weight computation parameters of the weight computation unit 22 so that the large-scale model loss and the target model loss are reduced (step S49). Further, the parameter correcting unit 33 corrects the parameters in the target model object detection unit 31 so that the target model loss is reduced (step S50). The object detection device 10x repeats the above-described steps S41 to S50 for a predetermined period of time, and ends the processing.

As described above, according to the object detection device 10x of the second example embodiment, the learning step of the large-scale model and the learning step of the target model can be executed simultaneously. Therefore, it becomes possible to efficiently construct a target model suitable for the environment of the new site.

(Functional Configuration for Inference)

Since the object detection device for inference according to the second example embodiment is the same as the object detection device 40 for inference according to the first example embodiment shown in FIG. 9 and operates in the same manner, description thereof will be omitted.

(Modification)

The modifications (1) to (7) in the first example embodiment can be similarly applied in the second example embodiment.

Third Example Embodiment

Figure 12:
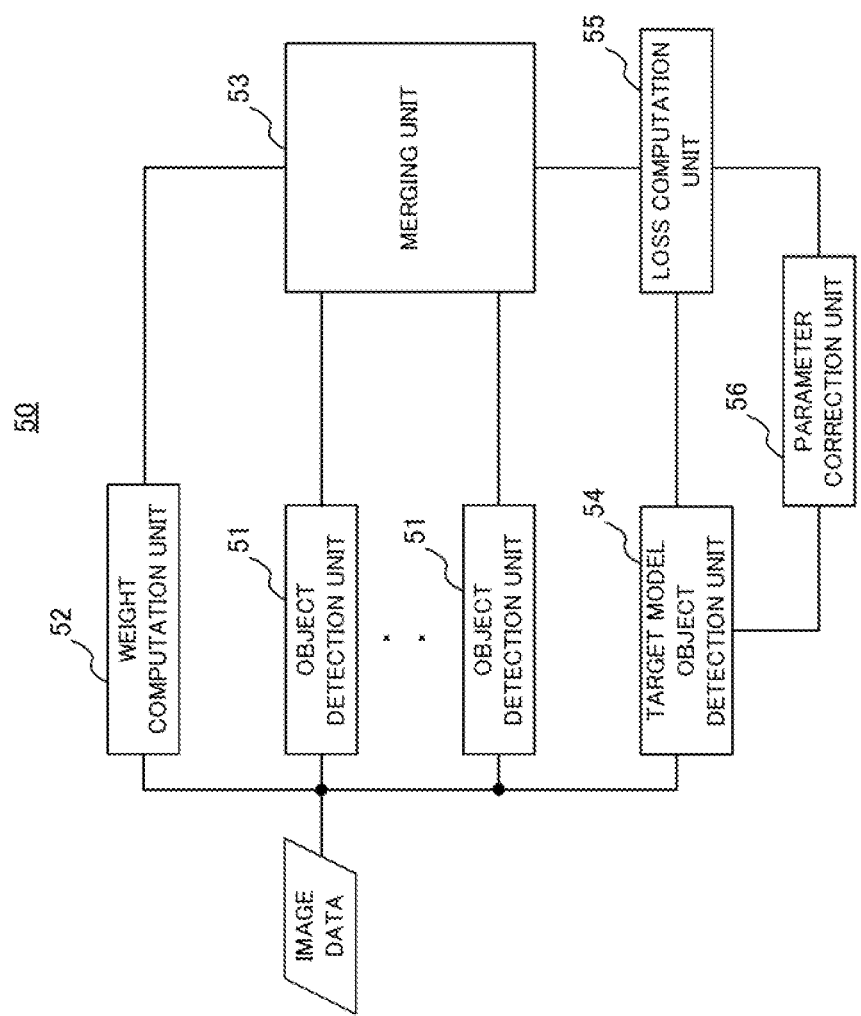
FIG. 12 illustrates a functional configuration of the object detection device for learning according to a third example embodiment.

Next, a third example embodiment of the present invention will be described. FIG. 12 shows a functional configuration of an object detection device 50 for learning according to a third example embodiment. Incidentally, the object detection device 50 is realized by the hardware configuration shown in FIG. 6.

The object detection device 50 includes a plurality of object detection units 51, a weight computation unit 52, a merging unit 53, a target model object detection unit 54, a loss computation unit 55, and a parameter correction unit 56. The plurality of object detection units 51 output a score indicating a probability that a predetermined object exists for each partial region set to the inputted image data. The weight computation unit 52 computes weights for merging the scores outputted by the plurality of object detection units 51 using the weight computation parameters based on the image data. The merging unit 53 merges the scores outputted by the plurality of object detection units 51, for each partial region, with the weights computed by the weight computation unit 52.

The target model object detection unit 54 outputs a score indicating the probability that a predetermined object exists for each partial region set to the image data. The loss computation unit 55 computes a loss indicating a difference of the output of the target model object detection unit 54 from the ground truth label of the image data and the score merged by the merging unit 53. Then, the parameter correction unit 56 corrects the parameters of the target model object detection unit 54 so that the loss is reduced.

A part or all of the example embodiments described above may also be described as the following supplementary notes, but not limited thereto.

(Supplementary Note 1)

An object detection device comprising:

a plurality of object detection units configured to output a score indicating probability that a predetermined object exists, for each partial region set to image data inputted;

a weight computation unit configured to compute weights for merging the scores outputted by the plurality of object detection units, using weight calculation parameters, based on the image data;

a merging unit configured to merge the scores outputted by the plurality of object detection units, for each partial region, with the weights computed by the weight computation unit;

a target model object detection unit configured to output a score indicating probability that the predetermined object exists, for each partial region set to the image data;

a first loss computation unit configured to compute a first loss indicating a difference of the score of the target model object detection unit from a ground truth label of the image data and the score merged by the merging unit; and a first parameter correction unit configured to correct parameters of the target model object detection unit to reduce the first loss.

(Supplementary Note 2)

The object detection device according to supplementary note 1, further comprising:

a second loss computation unit configured to compute a second loss indicating a difference between the ground truth label and the score merged by the merging unit; and a second parameter correction unit configured to correct the weight calculation parameters to reduce the second loss.

(Supplementary Note 3)

The object detection device according to supplementary note 2, wherein the second parameter correction unit corrects the weight computation parameters based on the first loss and the second loss.

(Supplementary Note 4)

The object detection device according to any one of supplementary notes 1 to 3, wherein the image data includes unlabeled image data that does not have a corresponding ground truth label, and wherein, for the unlabeled image data, the first loss computation unit computes a difference between the score outputted by the target model object detection unit and the score outputted by the merging unit as the first loss.

(Supplementary Note 5)

The object detection device according to any one of supplementary notes 1 to 4, wherein the weight computation unit computes a single weight for the image data, and wherein the merging unit merges the scores outputted by the plurality of object detection units with the single weights.

(Supplementary Note 6)

The object detection device according to any one of supplementary notes 1 to 4, wherein the weight computation unit computes a weight for each of the partial regions, and wherein the merging unit merges the scores outputted by the plurality of object detection units with the weight computed for each partial region.

(Supplementary Note 7)

The object detection device according to any one of supplementary notes 1 to 4, wherein the weight computation unit computes the weights for each class indicating the object, and wherein the merging unit merges the scores outputted by the plurality of object detection units with the weights computed for each class.

(Supplementary Note 8)

The object detection device according to any one of supplementary notes 1 to 7, wherein the merging unit multiplies the scores outputted by the plurality of object detection units by the weight of each object detection unit computed by the weight computation unit, and adds results of multiplications to compute an average value.

(Supplementary Note 9)

The object detection device according to supplementary note 2, wherein each of the plurality of object detection units and the target model object detection unit outputs coordinate information of a rectangular region in which the object exists for each of the partial regions, wherein the merging unit merges the coordinate information with the weights computed by the weight computation unit, wherein the first loss computation unit computes a first loss indicating a difference of the output of the target model object detection unit from the ground truth label and the score merged by the merging unit, and wherein the second loss computation unit computes a loss including a difference between the coordinate information merged by merging unit and the ground truth label.

(Supplementary Note 10)

The object detection device according to supplementary note 9, wherein the merging unit multiplies the coordinate information outputted by the plurality of object detection units by the weight of each object detection unit computed by the weight computation unit, and adds results of multiplications to compute an average value.

(Supplementary Note 11)

A learning method of an object detection device comprising:

outputting a score indicating probability that a predetermined object exists, for each partial region set to inputted image data, from a plurality of object detection units;

computing weights for merging the scores outputted by the plurality of object detection units, using weight calculation parameters, based on the image data;

merging the scores outputted by the plurality of object detection units, for each partial region, with the computed weights;

outputting a score indicating probability that the predetermined object exists, for each partial region set to the image data, from a target model object detection unit;

computing a first loss indicating a difference of the score of the target model object detection unit from a ground truth label of the image data and the merged score; and correcting parameters of the target model object detection unit to reduce the first loss.

(Supplementary Note 12)

A recording medium recording a program causing a computer to execute a learning processing of an object detection device, comprising:

outputting a score indicating probability that a predetermined object exists, for each partial region set to inputted image data, from a plurality of object detection units;

computing weights for merging the scores outputted by the plurality of object detection units, using weight calculation parameters, based on the image data;

merging the scores outputted by the plurality of object detection units, for each partial region, with the computed weights;

outputting a score indicating probability that the predetermined object exists, for each partial region set to the image data, from a target model object detection unit;

computing a first loss indicating a difference of the score of the target model object detection unit from a ground truth label of the image data and the merged score; and correcting parameters of the target model object detection unit to reduce the first loss.

The foregoing describes the present invention with reference to example embodiments and examples, but the present invention is not limited to the above example embodiments and examples. The configuration and details of the present invention may be subjected to various modifications that would occur to persons skilled in the art within the scope of the invention.

DESCRIPTION OF SYMBOLS

1 Large-scale model
2 Learned model
3 Gating network
4 Arithmetic unit
5 Target model
10, 10x, 40, 50 Object detection device
21 Image input unit
22, 52 Weight computation unit
23, 24, 51 Object detection unit
25 Product sum part
26, 33, 56 Parameter correction unit
27, 32, 55 Loss computation unit
28 Ground truth label storage unit
31 Target model object detection unit
41 Maximum value selection unit
53 Merging unit

What is claimed is:

1. An object detection device comprising:
a memory storing instructions; and
one or more processors configured to execute the instructions to:
respectively output, by a plurality of object detection units, scores indicating a probability that a predetermined object exists, for each of a plurality of partial regions set to image data that has been input;
compute weights for merging the scores output by the plurality of object detection units for each partial region, using weight calculation parameters, based on the image data;
merge the scores output by the plurality of object detection units, for each partial region, using the computed weights, to generate a merged score for each partial region-;
output, by a target model object detection unit, a score indicating a probability that the predetermined object exists, for each partial region;
compute a first loss indicating a difference of the score of the target model object detection unit from a ground truth label of the image data and the merged score, for each partial region; and
correct parameters of the target model object detection unit to reduce the first loss.

2. The object detection device according to claim 1, wherein the processor is further configured to:
compute a second loss indicating a difference between the ground truth label and the merged score, for each partial region; and
correct the weight calculation parameters to reduce the second loss.

3. The object detection device according to claim 2, wherein the processor is configured to correct the weight computation parameters based on the first loss and the second loss.

4. The object detection device according to claim 2, wherein processor is configured to output, by each of the plurality of object detection units and the target model object detection unit, coordinate information of a rectangular region in which the predetermined object exists for each partial region,
wherein the processor is configured to merge the coordinate information with the computed weights,
wherein the processor is configured to compute a first loss indicating a difference of the output of the target model object detection unit from the ground truth label and the merged score-, for each partial region, and
wherein the processor is configured to compute a loss including a difference between the merged coordinate information merged and the ground truth label.

5. The object detection device according to claim 4, wherein the processor is configured to multiply the coordinate information output by the plurality of object detection units by the computed weights, respectively, and compute an average value based on the multiplied scores.

6. The object detection device according to claim 1,
wherein the image data includes unlabeled image data that does not have a corresponding ground truth label, and
wherein, for the unlabeled image data, the processor is configured to compute a difference between the score output by the target model object detection unit and the merged score as the first loss, for each partial region.

7. The object detection device according to claim 1,
wherein the processor is configured to respectively compute single weights for the image data for the plurality of object detection units, and
wherein the processor is configured to merge the scores output by the plurality of object detection units, for each partial region, using single weights.

8. The object detection device according to claim 1,
wherein the processor is configured to respectively compute weights for each of the partial regions for the plurality of object detection units, and
wherein the processor is configured to merge the scores output by the plurality of object detection units, for each partial region, using the weights computed for each partial region.

9. The object detection device according to claim 1,
wherein the processor is configured to compute the weights for each of a plurality of classes indicating the predetermined object, and
wherein the processor is configured to merge the scores output by the plurality of object detection units with the weights computed for each class.

10. The object detection device according to claim 1, wherein the processor is configured to multiply the scores output by the plurality of object detection units by the computed weights, respectively, and compute an average value based on the multiplied scores.

11. A learning method performed by an object detection device and comprising:
respectively outputting, by a plurality of object detection units, scores indicating a probability that a predetermined object exists, for each of a plurality of partial regions set to image data that has been input;
computing weights for merging the scores output by the plurality of object detection units for each partial region, using weight calculation parameters, based on the image data;
merging the scores output by the plurality of object detection units, for each partial region, using the computed weights, to generate a merged score for each partial region;
outputting, by a target model object detection unit, a score indicating a probability that the predetermined object exists, for each partial region;
computing a first loss indicating a difference of the score of the target model object detection unit from a ground truth label of the image data and the merged score, for each partial region; and
correcting parameters of the target model object detection unit to reduce the first loss.

12. A non-transitory computer-readable recording medium storing a program executable by an object detection device, to perform learning processing comprising:
respectively outputting, by a plurality of object detection units, scores indicating a probability that a predetermined object exists, for each of a plurality of partial regions set to image data that has been input;
computing weights for merging the scores output by the plurality of object detection units for each partial region, using weight calculation parameters, based on the image data;
merging the scores output by the plurality of object detection units, for each partial region, using the computed weights, to generate a merged score for each partial region;
outputting, by a target model object detection unit, a score indicating a probability that the predetermined object exists, for each partial region;
computing a first loss indicating a difference of the score of the target model object detection unit from a ground truth label of the image data and the merged score, for each partial region; and
correcting parameters of the target model object detection unit to reduce the first loss.

\* \* \* \* \*